United States Patent
Matsumura et al.

(10) Patent No.: US 9,473,557 B2
(45) Date of Patent: Oct. 18, 2016

(54) SERVER DEVICE, OUTPUT SYSTEM, SERVER METHOD, AND NON-TRANSITORY COMPUTER READABLE MEDIUM

(71) Applicant: FUJI XEROX CO., LTD., Minato-ku, Tokyo (JP)

(72) Inventors: Ryoji Matsumura, Kanagawa (JP); Yasuhiro Maruyama, Kanagawa (JP); Shin Ohtake, Kanagawa (JP); Manabu Iwasaki, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 466 days.

(21) Appl. No.: 14/024,337

(22) Filed: Sep. 11, 2013

(65) Prior Publication Data

US 2014/0280769 A1   Sep. 18, 2014

(30) Foreign Application Priority Data

Mar. 13, 2013   (JP) .................................. 2013-050219

(51) Int. Cl.
*G06F 15/16*  (2006.01)
*H04L 29/08*  (2006.01)
*H04L 29/06*  (2006.01)

(52) U.S. Cl.
CPC ................ *H04L 67/02* (2013.01); *H04L 69/08* (2013.01)

(58) Field of Classification Search
CPC .......... H04L 67/02; H04L 69/08; G06F 3/00
See application file for complete search history.

(56) References Cited

U.S. PATENT DOCUMENTS

| | | | |
|---|---|---|---|
| 8,578,261 B1* | 11/2013 | Gupta | G06F 17/30899 715/205 |
| 2002/0120875 A1 | 8/2002 | Kiwada et al. | |
| 2003/0030843 A1 | 2/2003 | Qiao | |
| 2008/0183729 A1* | 7/2008 | Wakazono | G06F 17/30893 |

(Continued)

FOREIGN PATENT DOCUMENTS

| | | |
|---|---|---|
| JP | 2002-055911 A | 2/2002 |
| JP | 2002-055913 A | 2/2002 |
| JP | 2002-055914 A | 2/2002 |

(Continued)

OTHER PUBLICATIONS

Communication dated Jul. 14, 2015 from the Japanese Patent Office in counterpart application No. 2013-050219.

*Primary Examiner* — Jonathan Bui
(74) *Attorney, Agent, or Firm* — Sughrue Mion, PLLC

(57) ABSTRACT

A server device includes a first accepting unit, a converting unit, a notifying unit, and a providing unit. The first accepting unit accepts a specification from a specifying device that specifies first content. In a case where a data format of the first content indicated by the specification is not a certain data format in which data is capable of being output by an output device, the converting unit converts the data format of the first content to the certain data format, thereby generating second content having the certain data format, and stores the second content. The notifying unit notifies the specifying device of a storage site of the second content. In a case where the output device requests to get content from the storage site of the second content by using information acquired from the specifying device, the providing unit provides the second content to the output device.

7 Claims, 7 Drawing Sheets

(56) References Cited

U.S. PATENT DOCUMENTS

| | | | | |
|---|---|---|---|---|
| 2008/0309961 | A1* | 12/2008 | Aichi | H04N 1/00244 358/1.15 |
| 2012/0307292 | A1* | 12/2012 | Urakawa | H04L 65/105 358/1.15 |
| 2013/0081146 | A1* | 3/2013 | Hakozaki | H04N 1/00222 726/28 |
| 2014/0213190 | A1* | 7/2014 | Yamaoka | G06F 3/1204 455/41.3 |
| 2015/0087356 | A1* | 3/2015 | Kobayashi | H04W 4/18 455/556.1 |

FOREIGN PATENT DOCUMENTS

| | | |
|---|---|---|
| JP | 2002-055915 A | 2/2002 |
| JP | 2002-055916 A | 2/2002 |
| JP | 2002-055917 A | 2/2002 |
| JP | 2002-055918 A | 2/2002 |
| JP | 2002-251356 A | 9/2002 |
| JP | 2003-058459 A | 2/2003 |
| JP | 2004-213445 A | 7/2004 |
| JP | 2005-38034 A | 2/2005 |
| JP | 2012-108759 A | 6/2012 |
| JP | 2012-113701 A | 6/2012 |

* cited by examiner

SERVER DEVICE, OUTPUT SYSTEM, SERVER METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-050219 filed Mar. 13, 2013.

BACKGROUND

Technical Field

The present invention relates to a server device, an output system, a server method, and a non-transitory computer readable medium.

SUMMARY

According to an aspect of the invention, there is provided a server device including a first accepting unit, a converting unit, a notifying unit, and a providing unit. The first accepting unit accepts a specification from a specifying device that specifies first content. In a case where a data format of the first content indicated by the specification accepted by the first accepting unit is not a certain data format in which data is capable of being output by an output device that outputs content, the converting unit converts the data format of the first content to the certain data format, thereby generating second content having the certain data format, and stores the second content. The notifying unit notifies the specifying device of a storage site of the second content. In a case where the output device requests to get content from the storage site of the second content by using information acquired from the specifying device, the providing unit provides the second content to the output device.

BRIEF DESCRIPTION OF THE DRAWINGS

An exemplary embodiment of the present invention will be described in detail based on the following figures, wherein.

DETAILED DESCRIPTION

1. Exemplary Embodiment

1-1. Entire Configuration

Figure 1:
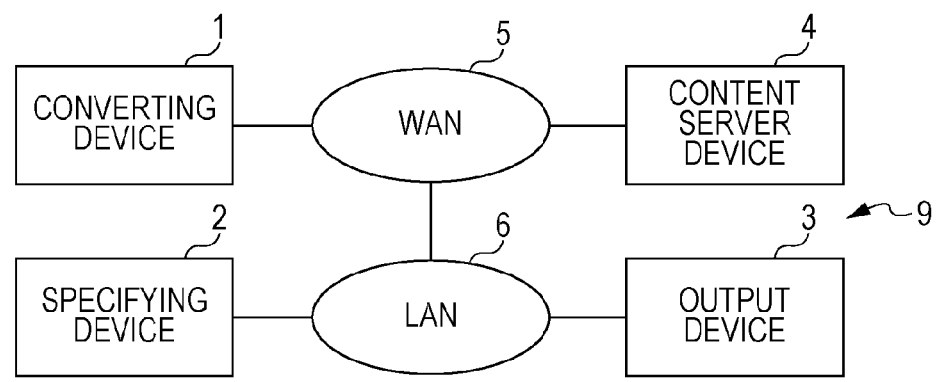
FIG. 1 is a diagram illustrating the entire configuration of an output system according to an exemplary embodiment of the present invention.

FIG. 1 is a diagram illustrating the entire configuration of an output system 9 according to an exemplary embodiment of the present invention. The output system 9 includes a converting device 1, a specifying device 2, an output device 3, a content server device 4, a wide area network (WAN) 5, and a local area network (LAN) 6.

The WAN 5 is a wide area communication network which is connected to the converting device 1, the content server device 4, and the LAN 6, and through which information is transmitted and received between these devices and the LAN 6. An example of the WAN 5 is the Internet.

The LAN 6 is a communication network which is connected to the specifying device 2 and the output device 3, and through which information is transmitted and received between these devices and the WAN 5. The LAN 6 is provided with a gateway server device (not illustrated) connected to the WAN 5. The gateway server device permits communication from a device connected to the LAN 6 (hereinafter referred to as a device on the LAN 6 side) to a device connected to the WAN 5 (hereinafter referred to as a device on the WAN 5 side). On the other hand, regarding communication from a device on the WAN 5 side to a device on the LAN 6 side, the gateway server device permits only a response to communication requested by a device on the LAN 6 side, and abandons the other communications. That is, the gateway server device functions as a so-called firewall.

The specifying device 2 is a terminal device that is connected to the LAN 6, accepts a user operation, and specifies, for the converting device 1, content indicated by the user operation (hereinafter such content is referred to as first content). Examples of the specifying device 2 are a smart phone and a tablet personal computer.

The converting device 1 is a server device that is connected to the WAN 5 and provides requested content to the output device 3. The converting device 1 accepts a specification from the specifying device 2, and acquires first content indicated by the specification from the content server device 4. In a case where the data format of the acquired first content is not a certain data format in which data is capable of being output by the output device 3, the converting device 1 converts the data format of the first content to the certain data format. The content generated by converting the data format of the first content (hereinafter referred to as second content) is stored in a memory 12 (see FIG. 2) by the converting device 1. At this time, the converting device 1 notifies the specifying device 2 which has specified the first content of a storage site of the second content, that is, a uniform resource identifier (URI) indicating a storage region in which the second content is stored in the memory 12. Also, the converting device 1 provides the second content to the output device 3 in a case where the output device 3 requests the second content.

Here, a "data format" is the format of data in which content is described. For example, in a case where the output device 3 is an image forming device, a data format in which data is capable of being output by the output device 3 may be a portable document format (PDF), a page description language (PDL), a tag image file format (TIFF), or the like. In a case where the output device 3 is a display device, a data format in which data is capable of being output by the output device 3 may be any of the above-described data formats, or may be a data format of a moving image file. In a case where the output device 3 is an audio playback device, a data format in which data is capable of being output by the output device 3 may be a data format of an audio file.

The content server device 4 is a server device connected to the WAN 5, and stores content. The content server device 4 accepts a request for content from the converting device 1, and provides the requested content to the converting device 1. Content is information in various data formats, such as a document file, an image file, a moving image file, an audio file, a data file generated by an application program, and a program file.

The output device 3 acquires, from the specifying device 2, the URI that the specifying device 2 has been notified of by the converting device 1. By using the acquired URI, the output device 3 requests the second content stored in the storage region indicated by the URL to the converting device 1. In response to the request, the converting device 1 provides the second content to the output device 3. The output device 3 outputs the second content provided from the converting device 1. The output device 3 is, for example, an electrophotographic image forming device, and forms an image representing the second content on a medium, such as a sheet, thereby outputting the second content.

1-2. Configuration of Converting Device

Figure 2:
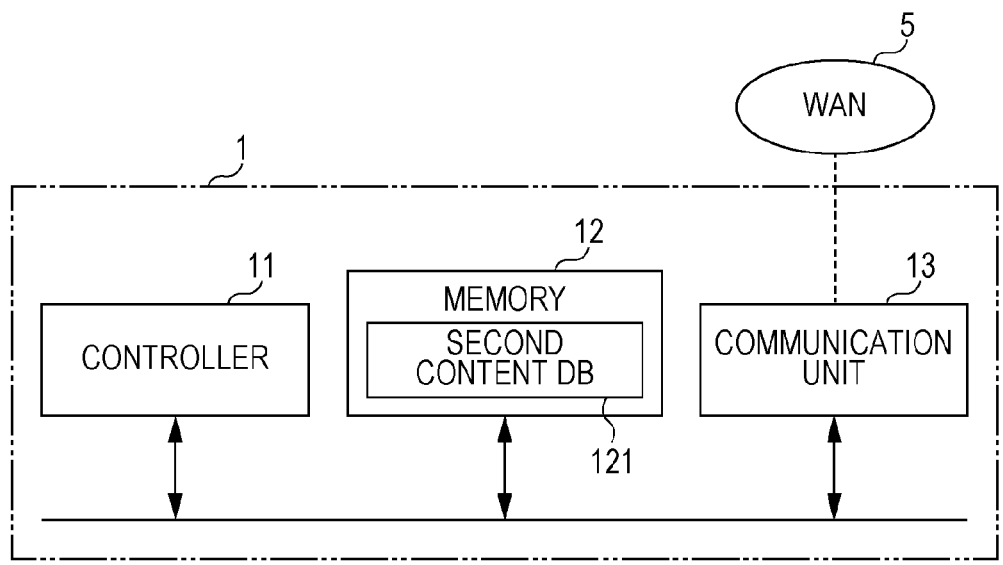
FIG. 2 is a diagram illustrating the configuration of a converting device according to the exemplary embodiment of the present invention.

FIG. 2 is a diagram illustrating the configuration of the converting device 1. A controller 11 controls the operations of individual units of the converting device 1. The controller 11 includes an arithmetic processing device such as a central processing unit (CPU), and storage devices such as a read only memory (ROM), a random access memory (RAM), a hard disk, and a flash memory, and executes programs stored in these storage devices. The storage devices may include a so-called removable disc, that is, a removable recording medium.

A communication unit 13 is an interface used for performing communication with another device via the WAN 5.

The memory 12 is a large-capacity memory such as a hard disk drive, and stores a program read by the controller 11. In this program, information about a data format in which data is capable of being output by the output device 3 is written in advance.

The memory 12 includes a second content database 121 ("database" is abbreviated as "DB" in the drawings), in which second content is stored in association with information representing the storage site of the second content. The controller 11 reads out second content from the second content database 121 in response to a request from the output device 3 and provides the second content to the output device 3.

1-3. Configuration of Second Content Database

Figure 3:
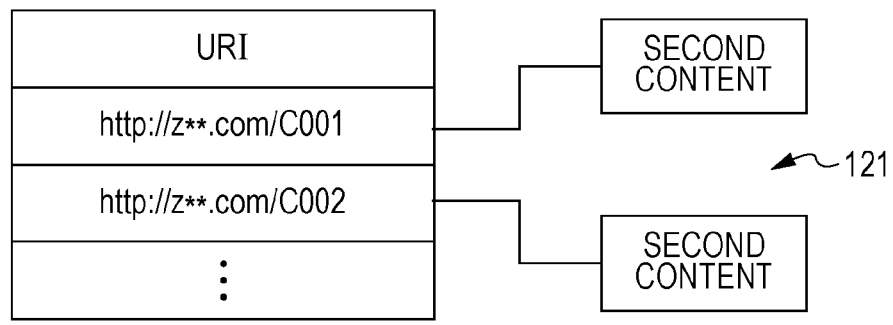
FIG. 3 is a diagram illustrating an example of the configuration of a second content database.

FIG. 3 is a diagram illustrating an example of the configuration of the second content database 121. The second content database 121 contains, as information indicating the storage sites of pieces of second content, a table in which URIs are written, such as "http://z.com/C001", as illustrated in FIG. 3**. The individual URIs are associated with the storage regions of the pieces of second content.

The controller 11, which accesses the second content database 121, determines whether or not the data format of first content specified by the specifying device 2 is a certain data format in which data is capable of being output by the output device 3, on the basis of the information written in the program in advance. In a case where the data format of the first content is not the certain data format, the controller 11 generates a URI indicating the storage site of second content that is acquired by converting the data format of the first content to the certain data format. Then, the controller 11 writes the generated URI in the table of the second content database 121, and reserves a storage region for storing the second content in the memory 12 in association with the written URI.

Further, in the case of accepting a request for second content from the output device 3, the controller 11 searches the above-described table for the URI included in the request, reads out the second content associated with the URI, and provides the second content to the output device 3.

1-4. Configuration of Specifying Device

Figure 4:
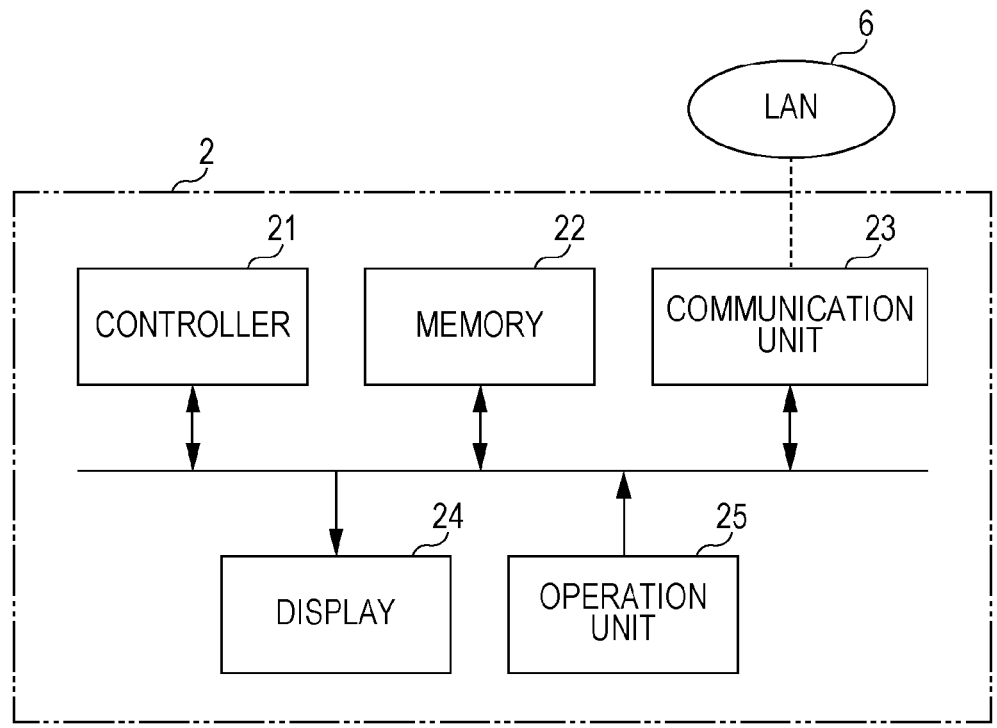
FIG. 4 is a diagram illustrating the configuration of a specifying device according to the exemplary embodiment of the present invention.

FIG. 4 is a diagram illustrating the configuration of the specifying device 2. A controller 21 controls the operations of individual units of the specifying device 2. The controller 21 includes an arithmetic processing device such as a CPU, and storage devices such as a ROM, a RAM, a hard disk, and a flash memory, and executes programs stored in these storage devices. The storage devices may include a so-called removable disc, that is, a removable recording medium. A memory 22 is a large-capacity memory such as a flash memory, and stores a program read by the controller 21.

A communication unit 23 is an interface used for performing communication with another device via the LAN 6. A display 24 is a display device such as a liquid crystal display, and displays an image in response to an instruction from the controller 21. An operation unit 25 includes operation devices, such as a coordinate acquiring unit and operation buttons for inputting various instructions, accepts a user operation, and supplies a signal corresponding to the user operation to the controller 21.

1-5. Configuration of Output Device

Figure 5:
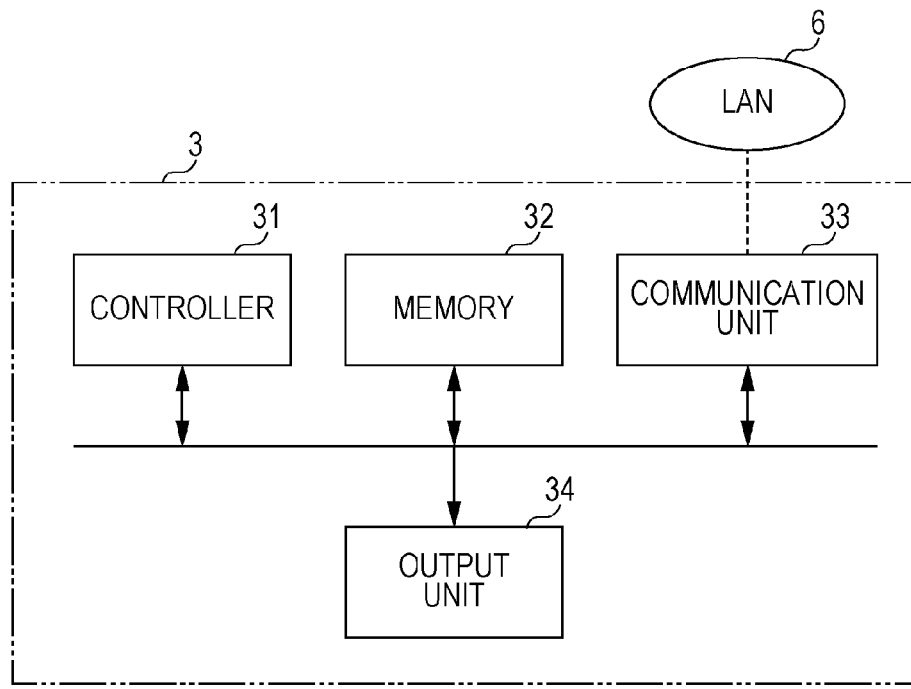
FIG. 5 is a diagram illustrating the configuration of an output device according to the exemplary embodiment of the present invention.

FIG. 5 is a diagram illustrating the configuration of the output device 3. A controller 31 controls the operations of individual units of the output device 3. The controller 31 includes an arithmetic processing device such as a CPU, and storage devices such as a ROM, a RAM, a hard disk, and a flash memory, and executes programs stored in these storage devices. The storage devices may include a so-called removable disc, that is, a removable recording medium.

A memory 32 is a large-capacity memory such as a flash memory, and stores a program read by the controller 31.

A communication unit 33 is an interface used for performing communication with another device via the LAN 6.

An output unit 34 forms an image by using image data specified by the controller 31, and includes, for example, an image carrier, a charging device, an irradiating unit, a supplying unit, a transfer unit, a fixing unit, and so forth (not illustrated). The image carrier is a member including a charge generation layer and a charge transport layer, and is, for example, a photoconductor drum that is cylindrical shaped and is rotated about its axis. The charging device is a member that causes the surface of the image carrier to be charged. The irradiating unit includes a laser light source, a polygon mirror, and so forth, is controlled by the controller 31, and irradiates the image carrier charged by the charging device with laser light corresponding to image data representing an image. Accordingly, an electrostatic latent image is carried by the image carrier.

The supplying unit supplies toner to the image carrier on which an electrostatic latent image is carried. The toner adheres to a portion on the surface of the image carrier that is exposed to light emitted from the irradiating unit, that is, an image portion of the electrostatic latent image. Accordingly, a developed image is formed on the image carrier. The transfer unit transfers the developed image formed on the image carrier to a medium. Accordingly, an image is formed on the medium. The fixing unit presses and heats the medium on which the image has been formed, and fixes the image by fusing developer transformed onto the medium. The medium may be a sheet of paper, or a sheet made of resin. That is, any types of medium may be used as long as an image may be recorded on the surface thereof.

1-6. Configuration of Content Server Device

Figure 6:
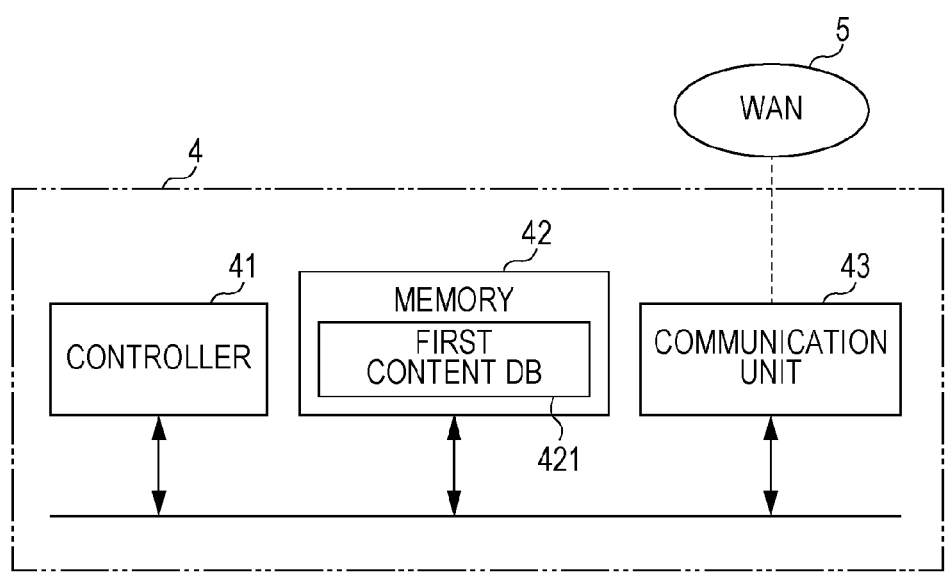
FIG. 6 is a diagram illustrating the configuration of a content server device according to the exemplary embodiment of the present invention.

FIG. 6 is a diagram illustrating the configuration of the content server device 4. A controller 41 controls the operations of individual units of the content server device 4. The controller 41 includes an arithmetic processing device such as a CPU, and storage devices such as a ROM, a RAM, a hard disk, and a flash memory, and executes programs stored in these storage devices. The storage devices may include a so-called removable disc, that is, a removable recording medium.

A communication unit 43 is an interface used for performing communication with another device via the WAN 5.

A memory 42 is a large-capacity memory such as a hard disk drive, and stores a program read by the controller 41. The memory 42 includes a first content database 421, in which first content is stored in association with identification information about the first content. The controller 41 reads out first content from the first content database 421 in response to a request from the converting device 1 or the output device 3, and provides the first content.

1-7. Configuration of First Content Database

Figure 7:
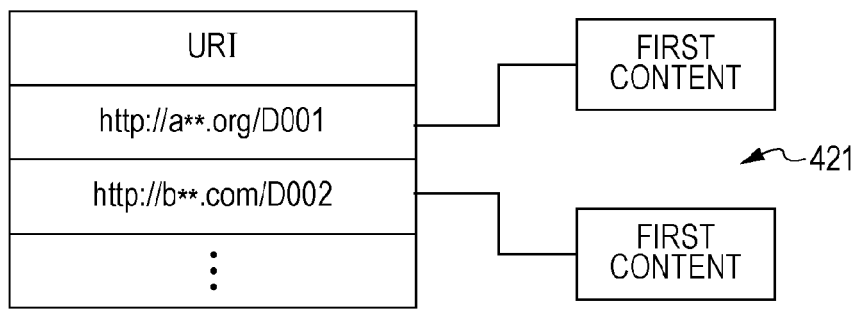
FIG. 7 is a diagram illustrating an example of the configuration of a first content database.

FIG. 7 is a diagram illustrating an example of the configuration of the first content database 421. The first content database 421 contains, as information indicating the storage sites of pieces of first content, a table in which URIs are written, such as "http://a**.org/D001", as illustrated in FIG. 7. The individual URIs are associated with the storage regions of the pieces of first content.

In the case of accepting a request for first content from the converting device 1, the controller 41, which accesses the first content database 421, searches the above-described table for the URI included in the request, reads out the first content associated with the URI, and provides the first content to the converting device 1.

1-8. Functional Configuration of Converting Device

Figure 8:
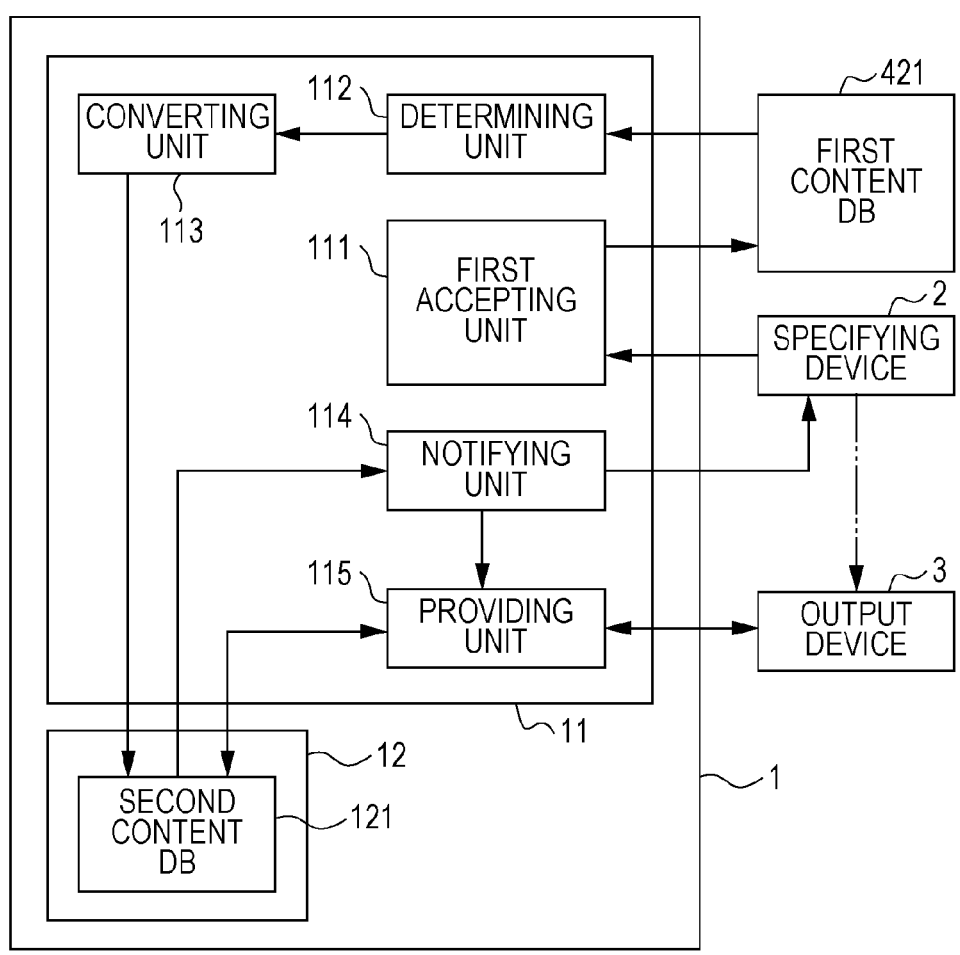
FIG. 8 is a diagram illustrating the functional configuration of the converting device according to the exemplary embodiment of the present invention.

FIG. 8 is a diagram illustrating the functional configuration of the converting device 1. The controller 11 functions as a first accepting unit 111, a determining unit 112, a converting unit 113, a notifying unit 114, and a providing unit 115. In FIG. 8, the illustration of the WAN 5, the LAN 6, and the communication unit 13 is omitted.

The first accepting unit 111 accepts a specification of first content from the specifying device 2. The specification of first content is performed by using the URI indicating the storage site in which the first content is stored. The first accepting unit 111 requests the specified first content to the content server device 4 on the basis of the accepted specification.

The content server device 4 that has accepted the request from the first accepting unit 111 specifies the first content in the first content database 421 by using the URI included in the request, and provides the first content to the converting device 1. The determining unit 112 implemented by the controller 11 analyzes the first content provided from the content server device 4, and determines whether or not the data format of the first content is a certain data format in which data is capable of being output by the output device 3. In a case where the determining unit 112 determines that the data format of the provided first content is not the certain data format, the controller 11 performs, as the converting unit 113, a process of converting the data format of the first content.

In a case where the data format of the first content indicated by the specification accepted by the first accepting unit 111 is not the certain data format, the converting unit 113 converts the data format of the first content to the certain data format, thereby generating second content having the certain data format, and stores the second content.

The notifying unit 114 notifies the specifying device 2 of the URI indicating the storage site of the second content generated through the conversion performed by the converting unit 113.

The providing unit 115 provides the second content to the output device 3 upon accepting, from the output device 3 that outputs content, a request for the second content stored in the storage region indicated by the URI reported from the notifying unit 114.

1-9. Operation of Converting Device

Figure 9:
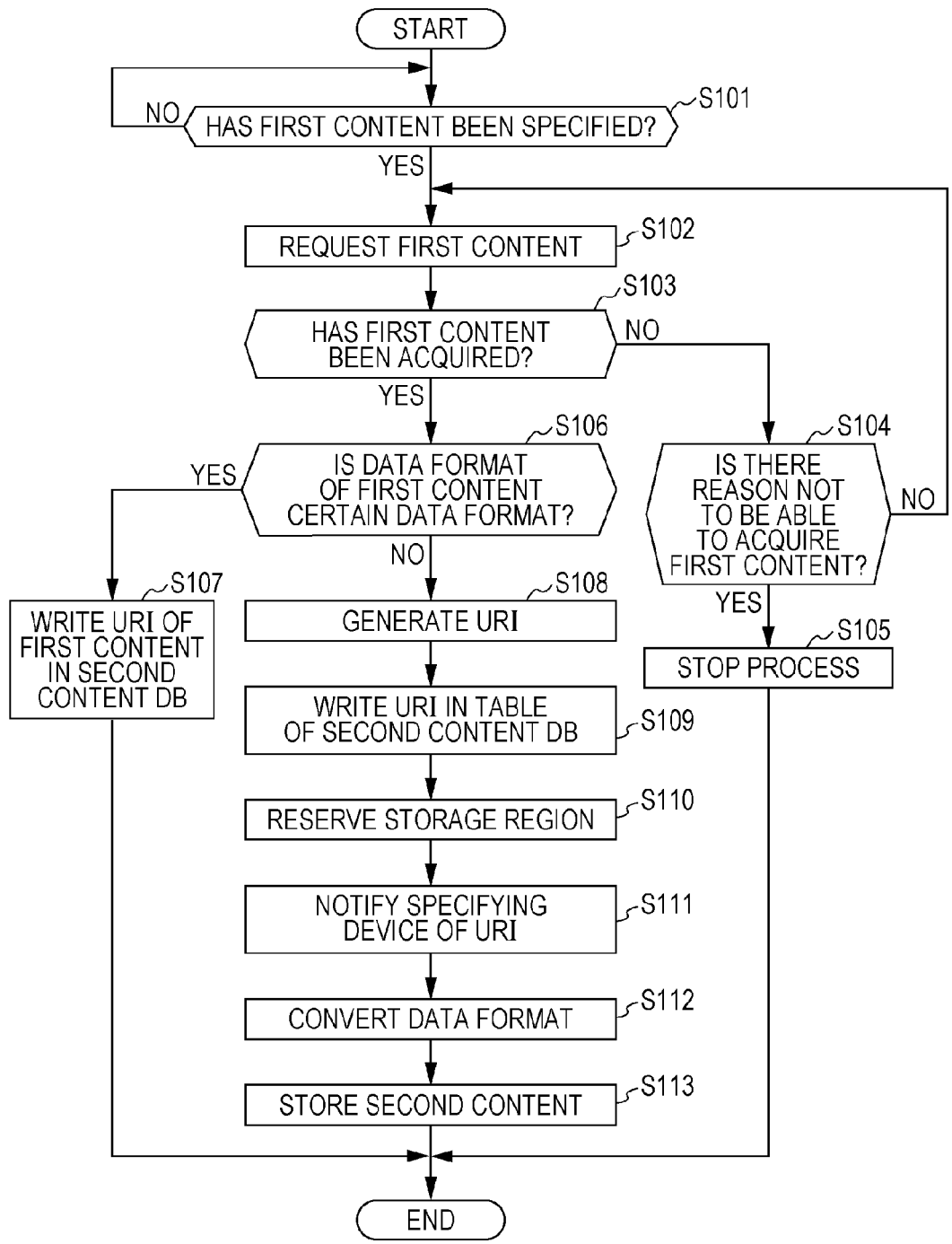
FIG. 9 is a flowchart illustrating an operation of converting a data format of content performed by the converting device.

FIG. 9 is a flowchart illustrating an operation of converting a data format of content, performed by the converting device 1. In step S101, the controller 11 of the converting device 1 determines whether or not first content has been specified by the specifying device 2. If it is determined that first content has not been specified by the specifying device 2 (NO in step S101), the controller 11 repeats the determination. If it is determined that first content has been specified by the specifying device 2 (YES in step S101), the controller 11 accesses the content server device 4 via the communication unit 13, and requests the first content by using a URI included in the specification accepted from the specifying device 2 in step S102.

In step S103, the controller 11 determines whether or not the first content has been acquired. If it is determined that the first content has not been acquired (NO in step S103), the controller 11 determines in step S104 whether or not there is a reason not to be able to acquire the first content. If it is determined that there is not a reason not to be able to acquire the first content (NO in step S104), the controller 11 returns to step S102, and requests the first content again. On the other hand, if it is determined that there is a reason not to be able to acquire the first content (YES in step S104), the controller 11 stops the process in step S105.

If it is determined that the first content has been acquired (YES in step S103), the controller 11 determines in step S106 whether or not the data format of the acquired first content is a certain data format in which data is capable of being output by the output device 3. If it is determined that the data format of the first content is the certain data format (YES in step S106), the controller 11 writes the URI of the first content in the second content database 121 of the memory 12 in step S107, and ends the process. The URI of the first content is included in the above-described specification.

On the other hand, if it is determined that the data format of the first content is not the certain format (NO in step S106), the controller 11 generates a URI indicating a storage region in the memory 12 in step S108, and writes the generated URI in the table of the second content database 121 in step S109. Then, the controller 11 reserves, in the memory 12, the storage region associated with the written URI in step S110, and notifies the specifying device 2 of the URI written in the table of the second content database 121 in step S111. The order in which steps S109 to S111 are performed may be changed, and the individual steps may be performed in parallel.

Subsequently, in step S112, the controller 11 converts the data format of the first content, which is determined in step S106 not to be the certain data format in which data is capable of being output by the output device 3, to the certain data format, thereby generating second content. In step S113, the controller 11 stores the generated second content in the region reserved in step S110, and ends the process.

Figure 10:
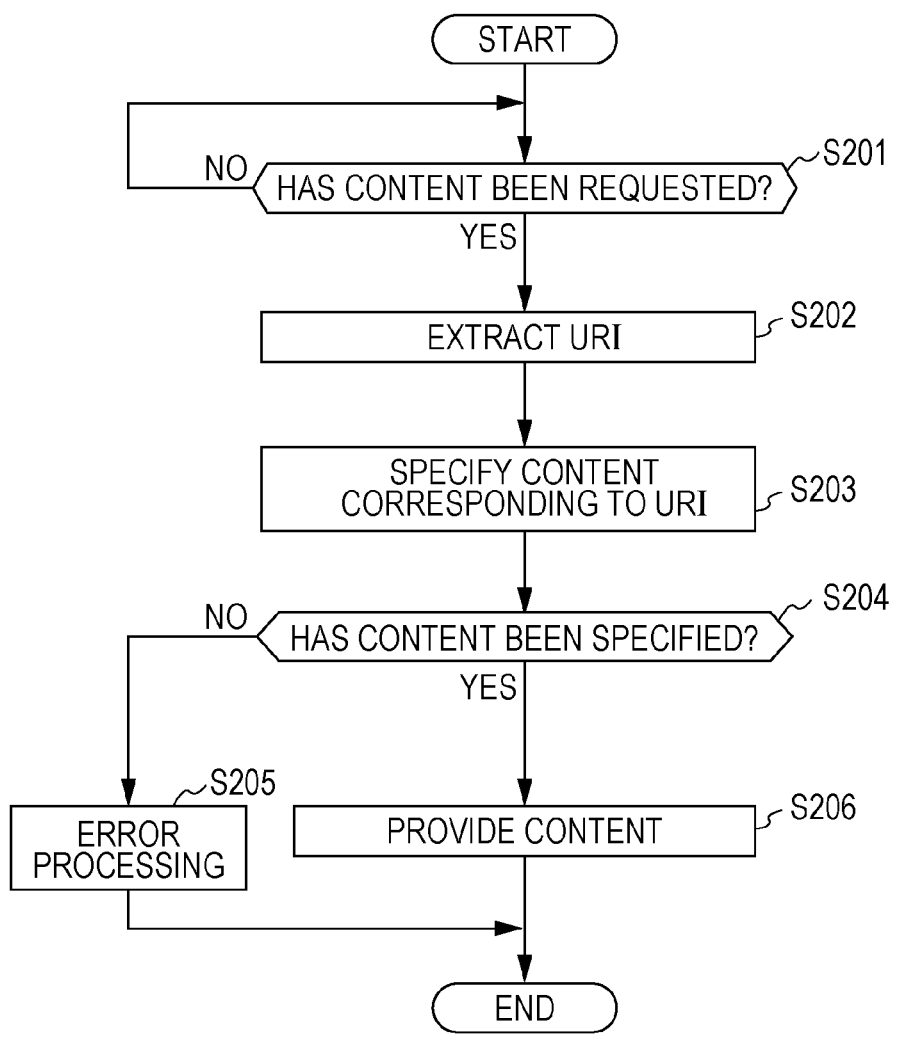
FIG. 10 is a flowchart illustrating an operation in which the converting device provides requested content.

FIG. 10 is a flowchart illustrating an operation in which the converting device 1 provides content requested from the output device 3. In step S201, the controller 11 of the converting device 1 determines whether or not content has been requested from the output device 3. If it is determined that content has not been requested from the output device 3 (NO in step S201), the controller 11 repeats the determination. If it is determined that content has been requested from the output device 3 (YES in step S201), the controller 11 extracts a URI from the request in step S202, and tries to specify the content corresponding to the URI by referring to the second content database 121 in step S203. In step S204, the controller 11 determines whether or not the content has been specified. If it is determined that the content has not been specified (NO in step S204), the controller 11 performs error processing in step S205. Here, error processing may be ending the process without performing anything, or notifying the output device 3 that the request is inappropriate and content is not specified.

On the other hand, if it is determined that the content has been specified (YES in step S204), the controller 11 provides the specified content to the output device 3 in step S206, and ends the process. After providing the content to the output device 3, in a case where the content is second content stored in the second content database 121, the controller 11 may erase the second content from the memory 12, and may delete the URI corresponding to the second content from the second content database 121 or may invalidate the URI.

With the above-described operation, in a case where the output device 3 retrieves, from the converting device 1, content whose data format is not a certain data format in which data is capable of being output by the output device 3, and outputs the content, the converting device 1 converts the data format of the content to the certain data format and then provides the content to the output device 3. Therefore, it is not necessary for the user of the output device 3 to check the data format of provided content and to determine whether or not the data format of the content is to be converted. Further, it is not necessary for the output device 3 to execute a process of converting the data format of content in which data is incapable of being output by the output device 3 to a data format in which data is capable of being output by the output device 3.

2. Exemplary Modifications

The exemplary embodiment described above may be modified in the following manner. Alternatively, the following exemplary modifications may be combined.

2-1. First Exemplary Modification

In the above-described exemplary embodiment, the controller 11 determines whether or not the data format of first content specified by the specifying device 2 is a certain data format in which data is capable of being output by the output device 3, by using information written in a program in advance. Alternatively, the determination may be performed by using other information. For example, the controller 11 may accept, from the specifying device 2, information representing a data format in which data is capable of being output by the output device 3.

Figure 11:
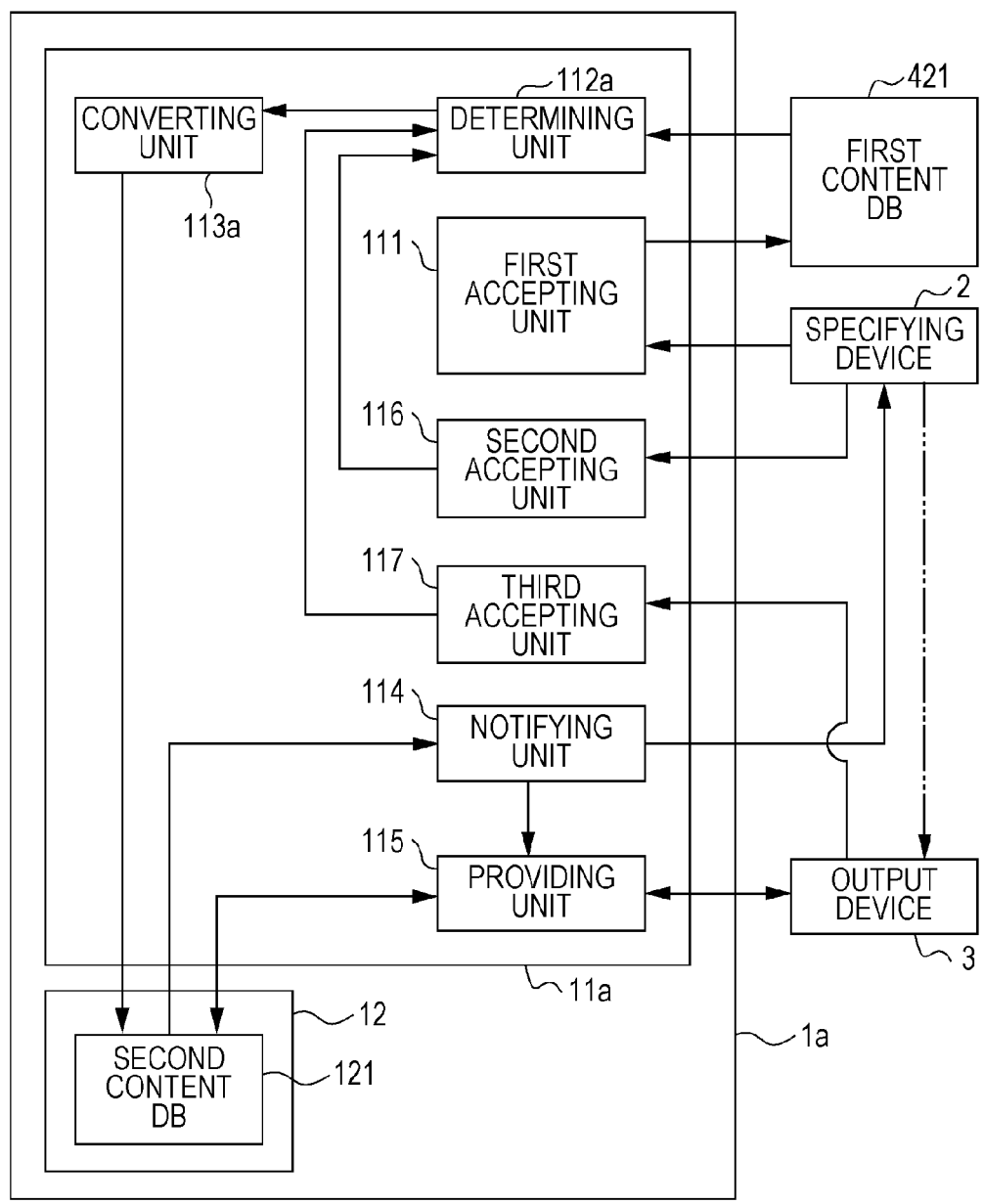
FIG. 11 is a diagram illustrating the functional configuration of a converting device according to an exemplary modification.

FIG. 11 is a diagram illustrating the functional configuration of a converting device 1a according to a first exemplary modification. A controller 11a of the converting device 1a functions as a second accepting unit 116 that accepts, from the specifying device 2, information representing a certain data format in which data is capable of being output by the output device 3. Upon accepting information representing a certain data format in which data is capable of being output by the output device 3 from the specifying device 2, the second accepting unit 116 transmits the information to a determining unit 112a. The determining unit 112a analyzes first content provided from the content server device 4, and determines whether or not the data format of the first content is the certain data format represented by the information accepted by the second accepting unit 116. On the basis of the determination result generated by the determining unit 112a, in a case where the data format of the first content is not the certain data format represented by the above-described information, a converting unit 113a converts the data format of the first content to the certain data format.

2-2. Second Exemplary Modification

The controller 11 may accept, from the output device 3, information representing a certain data format in which data is capable of being output by the output device 3. In this case, the controller 11a of the converting device 1a functions as a third accepting unit 117 that accepts, from the output device 3, information representing the certain data format in which data is capable of being output by the output device 3. Upon accepting information representing the certain data format from the output device 3, the third accepting unit 117 transmits the information to the determining unit 112a. The determining unit 112a analyzes first content provided from the content server device 4, and determines whether or not the data format of the first content is the certain data format represented by the information accepted by the third accepting unit 117. On the basis of the determination result generated by the determining unit 112a, in a case where the data format of the first content is not the certain data format represented by the information, the converting unit 113*a* converts the data format of the first content to the certain data format.

2-3. Third Exemplary Modification

In the above-described exemplary embodiment, if it is determined that the data format of first content is a certain data format in which data is capable of being output by the output device 3, the controller 11 writes the URI of the first content in the second content database 121 of the memory 12. Alternatively, the first content may be copied and stored in the memory 12 without converting the data format of the first content, and the URI of the storage region in which the first content is stored in the memory 12 may be written in the second content database 121. With this configuration, for example, even if the output device 3 is prohibited from acquiring content from a storage device other than the memory 12 of the converting device 1 by specifying an URL for security reasons or the like, the content specified by the specifying device 2 is provided to the output device 3.

2-4. Fourth Exemplary Modification

In the above-described exemplary embodiment, the notifying unit 114 notifies the specifying device 2 of a URI indicating the storage site of second content generated through conversion performed by the converting unit 113. Alternatively, the notifying unit 114 may notify the specifying device 2 of period information representing a period in which the providing unit 115 will provide the second content stored in the storage site, together with the URI indicating the storage site of the second content. In this case, after the period represented by the period information has elapsed, the providing unit 115 may prohibit provision of the second content, or delete the second content from the second content database 121.

2-5. Fifth Exemplary Modification

Programs executed by the controller 11 of the converting device 1 may be provided in the state of being stored in a computer-readable recording medium, for example, a magnetic recording medium such as a magnetic tape or a magnetic disk, an optical recording medium such as an optical disc, a magneto-optical recording medium, or a semiconductor memory. Further, the programs may be downloaded via a network such as the Internet. As the controller 11, various types of devices may be used instead of a CPU. For example, a dedicated processor may be used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A server device comprising:
a processor configured to execute:
a first accepting unit configured to accept a specification from a specifying device that specifies first content in a first content database;
a converting unit configured to, in a case where a data format of the first content indicated by the specification accepted by the first accepting unit is not a certain data format in which data is capable of being output by an output device that outputs content, convert the data format of the first content to the certain data format, thereby generating second content having the certain data format, and store the second content in second content database;
a notifying unit configured to notify the specifying device of a storage site of the second content in the second content database; and
a providing unit configured to, in a case where the output device requests to get content from the storage site of the second content by using information acquired from the specifying device, provide the second content to the output device,
wherein, in a case where the data format of the first content is the certain data format, the converting unit is further configured to store the first content in the second content database or a location information of the first content in the second content database, and the notifying unit is further configured to notify the specifying device of a storage site of the first content in the second content database.

2. The server device according to claim 1, wherein the processor is further configured to execute:
a second accepting unit configured to accept from the specifying device, information representing the certain data format in which data is capable of being output by the output device,
wherein, in a case where the data format of the first content is not the certain data format represented by the information accepted by the second accepting unit, the converting unit is further configured to convert the data format of the first content to the certain data format.

3. The server device according to claim 1, wherein the processor is further configured to execute:
a third accepting unit configured to accept, from the output device, information representing the certain data format in which data is capable of being output by the output device,
wherein, in a case where the data format of the first content is not the certain data format represented by the information accepted by the third accepting unit, the converting unit is further configured to convert data format of the first content to the certain data format.

4. The server device according to claim 1, wherein the notifying unit is further configured to notify the specifying device of period information representing a period in which the providing unit will provide the content stored in the storage site, together with the storage site.

5. An output system comprising:
a specifying device configured to specify first content in a first database;
an output device configured to output content; and
a server device configured to provide the content to the output device, the server device including a processor configured to execute:
a first accepting unit configured to accept a specification from the specifying device;

a converting unit configured to, in a case where a data format of the first content indicated by the specification accepted by the first accepting unit is not a certain data format in which data is capable of being output by the output device, convert the data format of the first content to the certain data format, thereby generating second content having the certain data format, and store the second content in a second database;

a notifying unit configured to notify the specifying device of a storage site of the second content in the second database; and a providing unit configured to, in a case where the output device requests to get content from the storage site of the second content by using information acquired from the specifying device, provide the second content to the output device, wherein the output device acquires the information indicating the storage site from the specifying device, and wherein, in a case where the data format of the first content is the certain data format, the converting unit is further configured to store the first content in the second database or a location information of the first content in the second database, and the notifying unit is further configured to notify the specifying device of a storage site of the first content in the second database.

6. A server method comprising:

accepting a specification from a specifying device that specifies first content in a first database;

in a case where a data format of the first content indicated by the accepted specification is not a certain data format in which data is capable of being output by an output device that outputs content, converting the data format of the first content to the certain data format, thereby generating second content having the certain data format, and storing the second content in a second database;

notifying the specifying device of a storage site of the second content in the second database; and in a case where the output device requests to get content from the storage site of the second content by using information acquired from the specifying device, providing the second content to the output device, wherein, in a case where the data format of the first content is the certain data format, storing the first content in the second database or storing a location information of the first content in the second database, and notifying the specifying device of a storage site of the first content in the second database.

7. A non-transitory computer readable medium storing a program causing a computer to execute a process, the process comprising:

accepting a specification from a specifying device that specifies first content in a first database;

in a case where a data format of the first content indicated by the accepted specification is not a certain data format in which data is capable of being output by an output device that outputs content, converting the data format of the first content to the certain data format, thereby generating second content having the certain data format, and storing the second content in a second database;

notifying the specifying device of a storage site of the second content in the second database; and in a case where the output device requests to get content from the storage site of the second content by using information acquired from the specifying device, providing the second content to the output device, wherein, in a case where the data format of the first content is the certain data format, storing the first content in the second database or storing a location information of the first content in the second database, and notifying the specifying device of a storage site of the first content in the second database.

* * * * *